United States Patent
May-Weymann

(10) Patent No.: US 9,204,422 B2
(45) Date of Patent: Dec. 1, 2015

(54) SCHEDULING MODIFICATION FOR EXPECTED PUBLIC WARNING SYSTEM MESSAGE

(71) Applicant: NVIDIA Corporation, Santa Clara, CA (US)

(72) Inventor: Alexander May-Weymann, Sophia Antipolis (FR)

(73) Assignee: NVIDIA CORPORATION, Santa Clara, CA (US)

( * ) Notice: Subject to any disclaimer, the term of this patent is extended or adjusted under 35 U.S.C. 154(b) by 234 days.

(21) Appl. No.: 13/898,706

(22) Filed: May 21, 2013

(65) Prior Publication Data

US 2014/0348072 A1    Nov. 27, 2014

(51) Int. Cl.
| | |
|---|---|
| *H04W 68/00* | (2009.01) |
| *H04W 24/00* | (2009.01) |
| *H04W 76/00* | (2009.01) |
| *H04W 48/16* | (2009.01) |
| *H04W 72/12* | (2009.01) |

(52) U.S. Cl.
CPC ............ *H04W 68/005* (2013.01); *H04W 24/00* (2013.01); *H04W 48/16* (2013.01); *H04W 76/00* (2013.01); *H04W 72/12* (2013.01)

(58) Field of Classification Search
None
See application file for complete search history.

(56) References Cited

U.S. PATENT DOCUMENTS

| | | | | |
|---|---|---|---|---|
| 7,626,962 | B1* | 12/2009 | Zhang et al. ................. | 370/329 |
| 2007/0191019 | A1* | 8/2007 | Fischer .............. | H04W 72/005 |
| | | | | 455/425.2 |
| 2009/0251315 | A1* | 10/2009 | Lee et al. ...................... | 340/540 |
| 2010/0151813 | A1* | 6/2010 | Faerber et al. ............. | 455/404.1 |
| 2013/0272251 | A1* | 10/2013 | Schmidt ............... | H04W 72/12 |
| | | | | 370/329 |
| 2014/0286305 | A1* | 9/2014 | Yamada ............. | H04W 36/165 |
| | | | | 370/331 |
| 2014/0342687 | A1* | 11/2014 | May-Weymann .......... | 455/404.2 |
| 2015/0181571 | A1* | 6/2015 | Park ........................ | H04J 11/00 |
| | | | | 370/252 |

FOREIGN PATENT DOCUMENTS

WO    WO 2012145901 A1  *  11/2012

* cited by examiner

*Primary Examiner* — Brandon Renner
*Assistant Examiner* — Deepa Belur

(57) ABSTRACT

One aspect provides a modem for use at a terminal. The modem comprises a first interface and a processing unit. The first interface is arranged to connect to a communications network. The processing unit is arranged to receive a message from the communications network via the first interface while in an operating mode. The processing unit is also arranged to assess the message on receipt to determine that one or more public warning message is to be broadcast to the modem from the communication network in a second later time period. The processing unit is also arranged to, based on the determination, modify operation of the modem in the second later time period to ensure the one or more public warning message is received and acted on by the modem.

28 Claims, 5 Drawing Sheets

SCHEDULING MODIFICATION FOR EXPECTED PUBLIC WARNING SYSTEM MESSAGE

TECHNICAL FIELD

This application is directed, in general, to Public Warning Systems and, more specifically, to scheduling modification for an expected Public Warning System message.

BACKGROUND

A device such as a smartphone, tablet or other mobile terminal may support one or more radio access technologies for communicating over a wireless cellular network. For example the device may support one or more of the 2G, 3G and LTE (Long Term Evolution) technologies. A radio access technology (or "RAT") is a manifestation in a device and/or network of a particular set of standardized specifications, comprising standardized protocols for communicating over the network. For example 2G, 3G and LTE technologies are defined in the various releases of the 3GPP (3rd Generation Partnership Project) standard. Each of the radio access technologies can be used for both voice over a dedicated voice channel and data over a general purpose packet-based data channel.

In a 3GPP environment, the radio access technology used by the device at any given time is subject to precise rules specified in the standard.

With the release 8 of the 3GPP specification, a feature called ETWS (Earthquake and Tsunami Warning System) was introduced. With release 9 of the 3GPP specification, a feature called CMAS (Commercial Mobile Alert System) was introduced. With release 10 of the 3GPP specification a feature called EU-Alert is introduced.

All of these three systems are used to inform a user of a device of possible threats like an earthquake that just has happened or an expected tsunami by way of a PWS message. Each of these three systems is commonly referred to as a Public Warning System (PWS). ETWS is the Japanese system, while CMAS is the US system and EU-alert will be the European system.

These three Public Warning Systems are described in more detail in the document "3rd Generation Partnership Project; Technical Specification Group Services and System Aspects; Public Warning System (PWS) requirements" Serial No. 3GPP TS 22.268 specification.

SUMMARY

One aspect provides a modem for use at a terminal. The modem comprises a first interface and a processing unit. The first interface is arranged to connect to a communications network. The processing unit is arranged to receive a message from the communications network via the first interface whilst in an operating mode. The processing unit is also arranged to assess the message on receipt to determine that one or more public warning message is to be broadcast to the modem from the communication network in a second later time period. The processing unit is also arranged to, based on the determination, modify operation of the modem in the second later time period to ensure the one or more public warning message is received and acted on by the modem.

Another aspect provides a method of operating a modem at a terminal. The modem has a processing unit and a first interface. The first interface is arranged to connect to a communications network. The method comprises receiving, in a first time period, a message from a communications network whilst in an operating mode. The method further comprises assessing the message on receipt to determine that one or more public warning message is to be broadcast to the modem from the communication network in a second later time period. The method further comprises modifying operation, based on the determination, of the modem in the second later time period to ensure the one or more public warning message is received and acted on by the modem.

In yet another aspect there is provided a computer program product for operating a modem for use at a terminal. The modem has a processing unit and a first interface. The first interface is arranged to connect to a communication network. The computer program product comprises code embodied on a non-transitory computer-readable medium. When the computer program product is executed on the processing unit, it is configured to assess a message, received in a first time period from a communications network whilst in an operating mode, on receipt to determine that one or more public warning message is to be broadcast to the modem from the communication in a second later time period. When the computer program product is executed on the processing unit, it is further configured to modify operation, based on the determination, of the modem in the second later time period to ensure the one or more public warning message is received and acted upon by the modem.

BRIEF DESCRIPTION OF THE DRAWINGS

Reference is now made to the following descriptions taken in conjunction with the accompanying drawings, in which.

DETAILED DESCRIPTION

Part of all three of the specifications is that the public warning message will be distributed via Cell Broadcast (CB). Cell Broadcast is a technique used for sending short text messages to all mobile stations in a defined geographical area. Example CB messages include public warning messages, advertisements, breaking news and sports updates.

The public warning messages are identified by message identifiers dedicated for a particular public warning system. When an expected CB message is a public warning message, i.e., a message regarding a natural disaster or other emergency situation, the scheduling behavior at the device for receipt of the CB message should be modified so that the public warning message is received and acted on accordingly by a user of the device.

Figure 1:
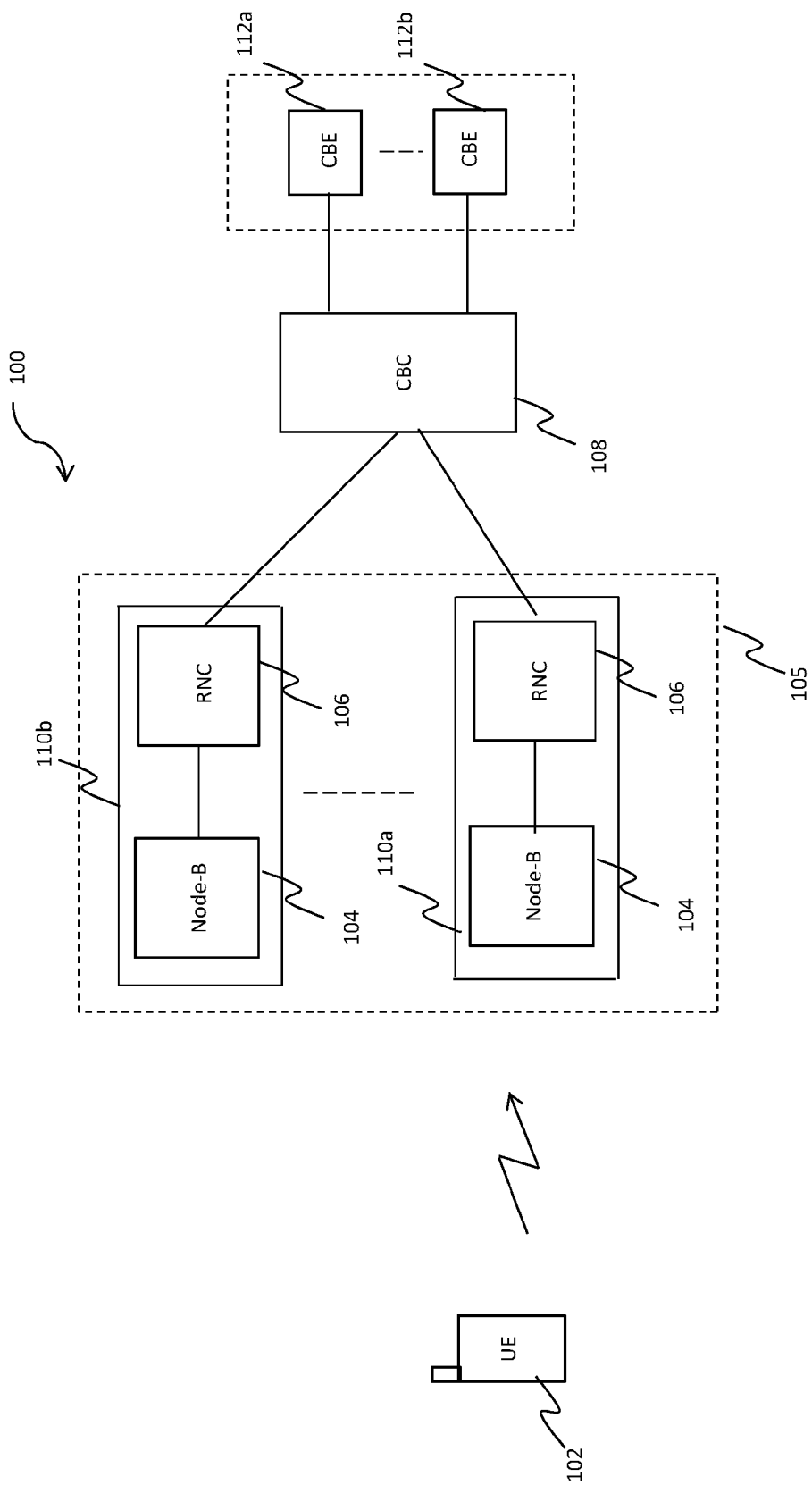
FIG. 1 shows a communication system.

With reference to FIG. 1, there is illustrated the main elements of a communication system, generally denoted by reference numeral 100. It will be understood that in FIG. 1 only sufficient elements of the system are shown in order to present the context of the arrangements of the disclosure.

The communication system 100 comprises a communications device termed user equipment (UE) 102. The UE 102 is in communication with a radio access network 105. The radio access network 105 is in communication with a cell broadcast center (CBC) 108 which is integrated as a node in the core network (CN). The CBC is in communication with one or more cell broadcast entity (CBE) 112. Through a CBE 112, content providers are able to create a PWS message and select the geographical location(s) they require a PWS message to be sent to. The PWS message is then sent to the CBC 108, which sends the PWS message to the required elements of the radio access network 105, which manage the broadcast of the PWS message in the targeted cells.

As a mere example, FIG. 1 shows a UMTS communication system 100 such that the radio access network 105 is a UMTS Terrestrial Radio Access Network (UTRAN).

The UTRAN 105 comprises one or more radio network sub-systems 110*a*, 110*b*. A radio network sub-system is a sub-network within the UTRAN 105 and comprises a base station 104 (termed node-B) and a radio network controller (RNC) 106. A node-B 104 is a transceiver which sends and receives wireless signals and defines a cell region. A RNC 106 is the network element responsible for the control of the radio resources of the UTRAN 105. A dedicated physical channel is established between the UE 102 and the node-B 104 to allow data communication to take place there between. It will be appreciated that a plurality of UEs and radio network sub-systems may be present in the UTRAN 105, which for clarity purposes are not shown.

Whilst the RNC 106 is shown in FIG. 1 to be in communication with the CBC 108, it will be appreciated that when the radio access network is configured in accordance with other radio access technologies (i.e., GSM, E-UTRAN etc.) an appropriate network element (i.e., a Base Station Controller (BSC) in a GSM network or a Mobile Management Entity (MME) in a E-UTRAN network) will be in communication with the CBC 108, such arrangements being well known to persons skilled in the art and are therefore not discussed in detail herein.

Figure 2A:
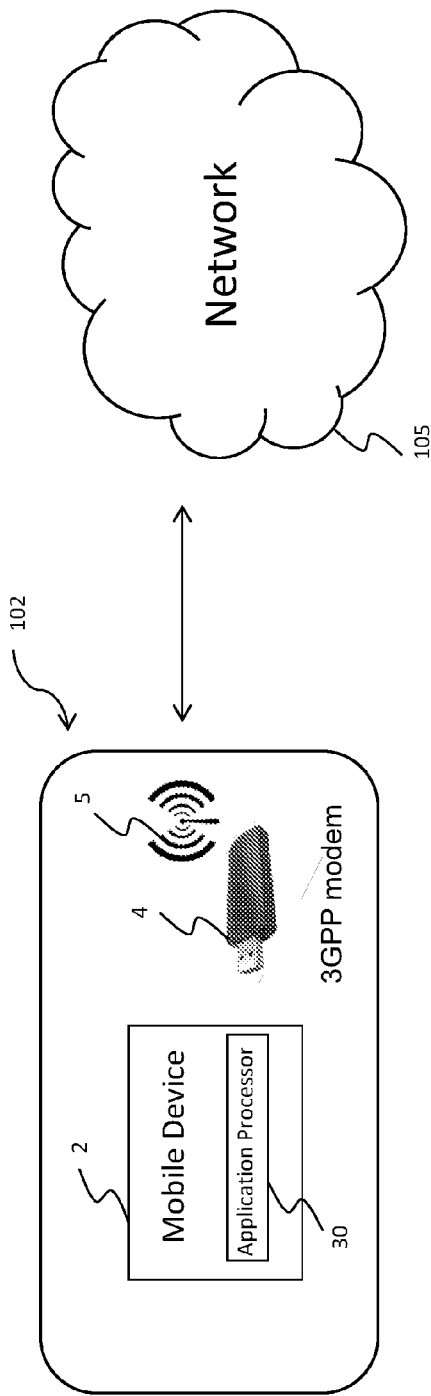
FIGS. 2a and 2b illustrate schematic block diagrams of a user equipment.
Figure 2B:
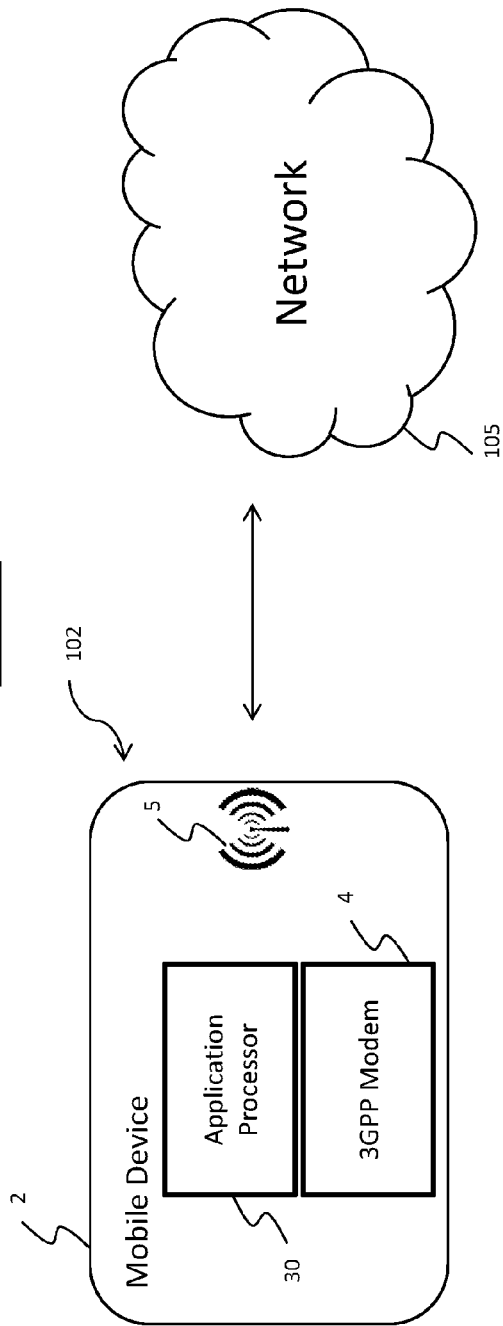

Reference is now made to FIG. 2*a* and FIG. 2*b* which illustrate schematic block diagrams of UE 102 comprising a host terminal 2 and a modem 4. The host terminal 2 may be a user terminal, and may for example take the form of a laptop computer, tablet style computer, personal digital assistant (PDA) or mobile phone (which may be referred to as a "smart phone") or any other device that exchanges data wirelessly. As shown in FIG. 2*a*, the modem 4 may for example take the form of a dongle for plugging into the host terminal 2 such that the modem 4 is connected to a host processor 30 (otherwise referred to as an application processor) of the host terminal 2. Alternatively the modem 4 may take the form of a mobile phone handset which, as well as being a conventional mobile telephone, can be connected to the host terminal 2 so as to act as an external cellular modem for the host terminal 2. As shown in FIG. 2*a*, the modem 4 may be external to the host terminal 2 in that it is a separate unit housed in a separate casing, but which is connected or connectable to the host processor 30 of the host terminal 2 by means of a wired or wireless connection (as well as being removable or being able to be disconnected from the host terminal 2). In another alternative set up, as shown in FIG. 2*b*, the modem 4 may be internal to the host terminal 2, e.g., taking the form of a wireless module in the host terminal 2. For example, both the modem 4 and host processor 30 may be housed within the same casing of the host terminal 2. For example the modem 4 may be internal to a mobile phone 2, and connected to the host processor 30 of the mobile phone 2 by way of a wired connection. The system could also be a single-chip design where the modem 4 and application processor 30 share the same die.

For connecting to the network 105, the modem 4 comprises a first interface.

With reference to the communication system shown in FIG. 2*a*, the first interface may comprise a wireless transceiver, typically in the form of a radio frequency (RF) transceiver and an antenna 5. The first interface of the modem connects via an antenna (not shown) of the network 105 enabling the modem 4 to establish a channel between itself and the network 105.

With reference to the communication system shown in FIG. 2*b*, the first interface may comprise a wired connection to an interface on the host terminal. The interface on the host terminal may comprise a wireless transceiver, typically in the form of a radio frequency (RF) transceiver and an antenna 5. The interface on the host terminal 2 connects via an antenna (not shown) of network 105 enabling the modem 4 to establish a channel between itself and the network 105.

This channel referred to above may be referred to as a "context". For example, if the network 105 is a 3GPP network, then the connection between the modem 4 and a 3GPP network 105 may be called a PDP (Packet Data Protocol) context in 2G or 3G terminology, and an EPS (Evolved Packet System) bearer context in LTE (Long Term Evolution standards) terminology. The physical medium of the connection is typically a radio channel such as a 2G, 3G or LTE radio channel and the protocol that drives it may comprise a set of protocol layers as defined for example by 3GPP standard specifications. The network 105 may be coupled to a further, packet-based network, preferably a wide area internetwork such as the Internet, by way of one or more gateway routers.

For connecting to the host processor 30 on the host terminal 2, the modem 4 comprises a second interface.

With reference to the communication system shown in FIG. 2*a*, the second interface, between the host processor 30 and modem 4, could for example comprise a wired connection such as a serial interface, for example a Universal Serial Bus (USB), or a short-range wireless transceiver such as an infrared connection or a radio frequency connection (e.g. Bluetooth).

With reference to the communication system shown in FIG. 2*b*, the second interface, between the host processor 30 and modem 4, could for example comprise a wired connection within the host terminal 2.

Figure 3A:
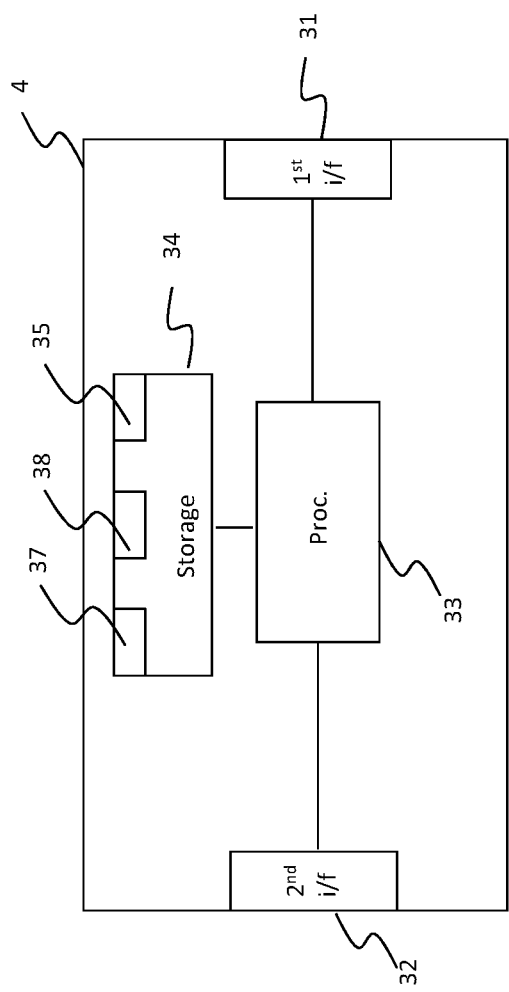
FIG. 3a is a schematic block diagram of a modem for use at a host terminal.

Referring to FIG. 3*a*, the modem 4 may comprise a processor 33 and, operatively coupled to the processor 33, a non-transitory computer-readable storage medium 34 such as a magnetic or electronic memory storing soft-modem code 35. The code 35 on the storage medium 34 is arranged to be executed on the processor 33, so as when executed to send and receive packets between the host 2 and network 105. However, the possibility of some or all of the modem functionality being implemented in dedicated hardware is not excluded. The modem 4 may be configured with additional functionality added in accordance with the present disclosure, an example of which will be discussed in more detail below.

Figure 3B:
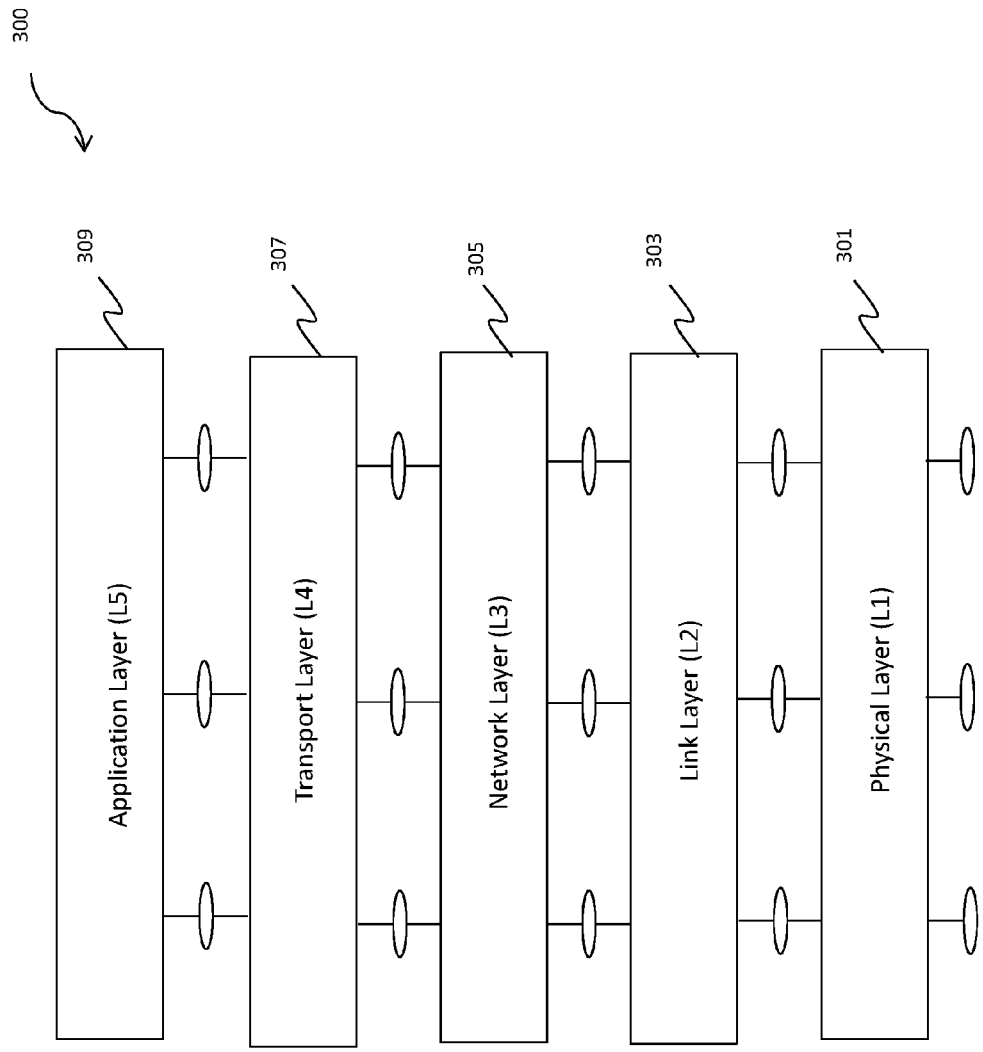
FIG. 3b shows a block diagram of a radio interface protocol architecture.

Referring to FIG. 3*b*, there is shown a simplified block diagram of a radio interface protocol architecture 300. Communications between the modem 4 and the radio access network 105 are effected in accordance with the multi-layered communications protocol as defined for example by 3GPP for transferring data across a radio channel such as a 2G, 3G or LTE radio channel. The protocol architecture comprises a physical layer (L1) 301, above the first layer is a link layer (L2) 303, above the second layer is a network layer (L3) 305, above the third layer is a transport layer (L4) 307, and above the fourth layer is an application layer (L5) 309. Operations performed at each of these layers are well known to persons skilled in the art and is therefore not discussed in detail herein.

The radio access network 105 is arranged to transmit broadcast messages to the UE 102 via a broadcast channel, i.e., a communication channel used for the transmission of broadcast data to the UE 102. This broadcast channel may be a cell broadcast (CB) channel. Cell Broadcast is an example broadcast service which is used for sending short text messages to all mobile stations in a defined geographical area. Example CB messages include public warning messages, advertisements, weather reports, breaking news and sports updates.

Each CB message contains a message identifier which identifies the source and type of the message. In particular, the radio access network 105 is arranged to use a certain range of message identifiers to identify public warning CB messages. The UE 102 is able to attempt to receive CB message(s) whose message identifier(s) match those in a configurable search list stored by the UE. The configurable search list 38 may be stored on a subscriber identity module (SIM) card, universal subscriber identity module (USIM) card, memory 34, or other memory location of the UE 102. In FIG. 3b the configurable search list 38 is shown as stored in memory 34. The configurable search list 38 may not necessarily be stored on the same physical memory device as the rest of the soft modem code 35, though it could be. Various other aspects of the current cell broadcast service (CBS) implementation are discussed in the document "3rd Generation Partnership Project; Technical Specification Group Core Network and Terminals; Technical Realization of Cell Broadcast Service (CBS)" Serial No. 3GPP TS 23.041.

Communications between the modem 4 and radio access network 105 may be effected in accordance with the multi-layered communications protocol 300. A device typically maintains a priority scheme defining the priority given to the reception of data on a plurality of communication channels at the physical layer, each of the communication channels having an associated level of priority.

A CB scheduling message contains information about subsequent CB message identifiers, including the timing of each transmission in the next schedule period. This allows the physical layer 301 to be configured for discontinuous reception (DRX). The DRX mode allows the UE 102 to conserve power by the modem 4 only listening to the time slots of a physical layer communication channel where the CB messages associated with the wanted CB message identifiers (the message identifiers stored in the configurable search list 38) are supposed to be received. Unwanted CB message identifiers are not scheduled for receiving.

CB messages and CB scheduling messages are received at the UE 102 on a cell broadcast channel.

In GSM, CB makes use of the logical Cell Broadcast Channel (CBCH), which is mapped on the Standalone Dedicated Control Channel (SDCCH) (the CBCH usually occupies a sub-slot of the SDCCH).

Referring to UMTS as an example, CB messages (and CB scheduling messages) may be sent from the radio access network 105 to the UE 102 using the DRX mode on the CTCH (Common Traffic Channel) logical channel. The MAC layer (of link layer 303) multiplexes the CTCH onto the FACH (Forward Access Channel) transport channel.

It will be appreciated by persons skilled in the art that a scheduling problem may occur at layer 1 (L1) in relation to the modem 4 reading the CB channel at the same time that the modem should perform another operation. In an example 3G implementation, the priority scheme maintained at the UE 102 gives priority to performing inter-frequency cell measurements (performed by the UE when the neighbor cell operate on a different carrier frequency, compared to the current cell), inter-RAT (radio access technology) cell measurements, and reading of the Broadcast transport Channel (BCH) over reading the CB channel because the CB information is normally available over multiple cycles (i.e., multiple time periods). In the worst case the CB channel can be scheduled every frame. In this case it's very likely L1 drops CB reception (reading of the CB channel) if it has to do one of the three example operations described above (which have a higher priority in the priority scheme).

The FACH transport channel can be mapped onto the same S-CCPCH (Secondary Common Control Physical Channel) as a PCH (Paging Channel) transport channel. Alternatively, the FACH and PCH transport channels can be mapped onto separate S-CCPCH channels. It will be appreciated by persons skilled in the art that a scheduling problem may occur in relation to reading the FACH and PCH channels.

In another example, the priority scheme maintained at the UE 102 gives priority to reception of the PCH over the FACH because the CB information is normally available over multiple cycles (i.e., multiple time periods). Thus, if there is a scheduling problem between reading a PCH time slot (for receiving a call) and reading a FACH time slot (for receiving a CB message), normally the reading of the FACH time slot for a CB message loses.

It is more important to receive a public warning message, i.e., a Tsunami warning, instead of answering a phone call or performing a measurement of the radio environment. Embodiments are described below in which scheduling behavior at a device is modified so that a public warning message is received and acted on accordingly by a user of the device.

In accordance with a first embodiment, the memory 34 stores a priority scheme 37 comprising a plurality of priority levels associated with respective communication channels, the plurality of priority levels defining the priority given to the respective communication channels for reception of data. The priority scheme 37 may be hardcoded in the soft modem code 35. The priority scheme 37 includes a priority level associated with a CB channel, i.e., a FACH channel (for reception of CB messages), and one or more further priority levels associated with respective one or more respective communication channels, i.e., the one or more further priority levels may include a priority level associated with a paging channel, one or more priority levels associated with performing radio environment measurements, a priority level associated with a BCH, and a priority level associated with a channel used for a random access procedure. This priority scheme 37 may not necessarily be stored on the same physical memory device as the rest of the soft modem code 35, though it could be.

The soft-modem code 35 comprises code so as to implement embodiments of the present disclosure. The steps are detailed below and illustrated in the flowchart 400 of FIG. 4.

At step S402, the UE 102 receives a CB scheduling message from the radio access network 105 on a cell broadcast channel whilst in DRX mode. The process 400 then proceeds to step S404.

At step S404, the modem 4 determines, from the CB scheduling message received at step S402, if one or more CB message is expected in the next schedule period. If the modem 4 determines at step S404 that one or more CB message is not expected in the next schedule period then the process 400 proceeds to step S406.

If the modem 4 determines at step S404 that one or more CB message is expected in the next schedule period then the process 400 proceeds to step 408. At step S408, the modem determines if the one or more expected CB message includes a public warning message identified by a message identifier stored in the configurable search list 38 stored by the UE 102. The modem 4 may implement step S408 by comparing the expected CB message identifier(s) included in the CB scheduling message to the identifier(s) stored in the configurable search list 38 stored by the UE 102.

If the modem 4 determines at step S408 that one or more expected CB message include a public warning message(s) identified by a message identifier stored in the configurable search list 38 stored by the UE 102, then the process proceeds to step S410. At step S410 the modem 4 is arranged to modify the internal scheduling behavior at the modem 4 for reception of the one more public warning CB message that is expected in the next schedule period. In particular, in the first embodiment at step S410 the modem 4 is arranged to modify the priority scheme stored in memory 34 to increase the priority of the CB reception for the time slots where the CB public warning message(s) is expected in the next schedule period. This may be implemented in a number of ways.

For example, the modem 4 may be arranged to modify the priority scheme 37 stored in memory 34 to increase the priority level associated with the cell broadcast channel such that the CB reception has the highest priority level in the priority scheme 37 for the time slots(s) where the CB public warning message(s) is expected in the next schedule period. That is, if there was a subsequent scheduling problem in a time slot in which the CB public warning message(s) is expected in the next schedule period, the reception of the cell broadcast channel would take priority over reception of any other communication channel.

In another implementation, the modem 4 may be arranged to modify the priority scheme 37 stored in memory 34 to increase the priority level associated with the cell broadcast channel such that CB reception has a higher priority level in the priority scheme 37 for the time slots(s) where the CB public warning message(s) is expected in the next schedule period than a communication channel used for reception of communications events from the radio access network, i.e., the paging channel. That is, if there was a subsequent scheduling problem in a time slot in which the CB public warning message(s) is expected in the next schedule period, the reception of the cell broadcast channel would take priority over reception of a communication event.

For the time slots in the next schedule period where a CB public warning message(s) is not expected, the modem uses a default (unmodified) priority scheme in case of a scheduling problem at layer 1.

If the modem 4 determines at step S408 that one or more expected CB message does not include a public warning message, then the process proceeds to step S406. At step S406, the modem 4 makes no modification to the default priority scheme stored in memory 34 for the time slot(s) in which a CB message is expected in the next schedule period. That is, if there is a subsequent scheduling problem in a time slot in which a CB message is expected in the next schedule period, the modem 4 would use the default priority scheme such that reception of a communication other than the cell broadcast channel may take priority over the cell broadcast channel i.e. reception of a call on PCH would take priority over reception of a weather report on FACH.

In the ETWS system, emergency information is delivered on two levels. A primary notification contains the minimum, most urgently required information to indicate the imminent occurrence of tsunami or earthquake. The primary notification conveys a small amount of data so that it can be sent quickly from the radio access network 105 to the UE 102. A secondary notification includes supplementary information not contained in the primary notification, such as seismic intensity, epicenter, and where to get help, etc.

In a UMTS ETWS communication system, an ETWS primary notification is broadcast from the radio access network to UE 102 over the paging channel. This indication can be transmitted in parallel to the CB PWS message (secondary notification) which is transmitted using the CTCH.

The receipt of an ETWS primary notification at UE 102 may trigger the process 400. That is, having received an ETWS primary notification from the radio access network 105, the UE 102 may wait for receipt of a scheduling message indicating a time slot in the next schedule period when the ETWS secondary notification is expected to be received.

If the configurable search list 38 stored by the UE 102 includes message identifiers associated with the ETWS system, then the process 400 would proceed to step S410 where the modem 4 is arranged to modify the internal scheduling behavior at the modem 4 for reception of the ETWS secondary notification that is expected in the next schedule period. In particular, at step S410 the modem 4 is arranged to modify the priority scheme 37 stored in memory 34 to increase the priority of the CB reception for the time slot where the ETWS secondary notification is expected in the next schedule period. The modification of the priority level associated with the cell broadcast channel may be implemented by the methods described above.

In a variant to the ETWS implementation described above, the receipt of an ETWS primary notification does not trigger the process 400. In this variant, upon receiving an ETWS primary notification, the UE 102 modem 4 is arranged to modify the priority scheme 37 stored in memory 34 to increase the priority of the CB reception such that CB has an increased priority level for all future time slots of the physical layer channel until the ETWS secondary notification is received. The modification of the priority level associated with the cell broadcast channel may be implemented by the methods described above. After receipt of the ETWS secondary notification the modem uses the default (unmodified) priority scheme 37 in case of a scheduling problem at layer 1.

It will be appreciated that in the first embodiment, the UE 102 remains in DRX mode during the process 400.

In accordance with a second embodiment, the UE 102 does not remain in DRX mode during the process 400.

Figure 4:
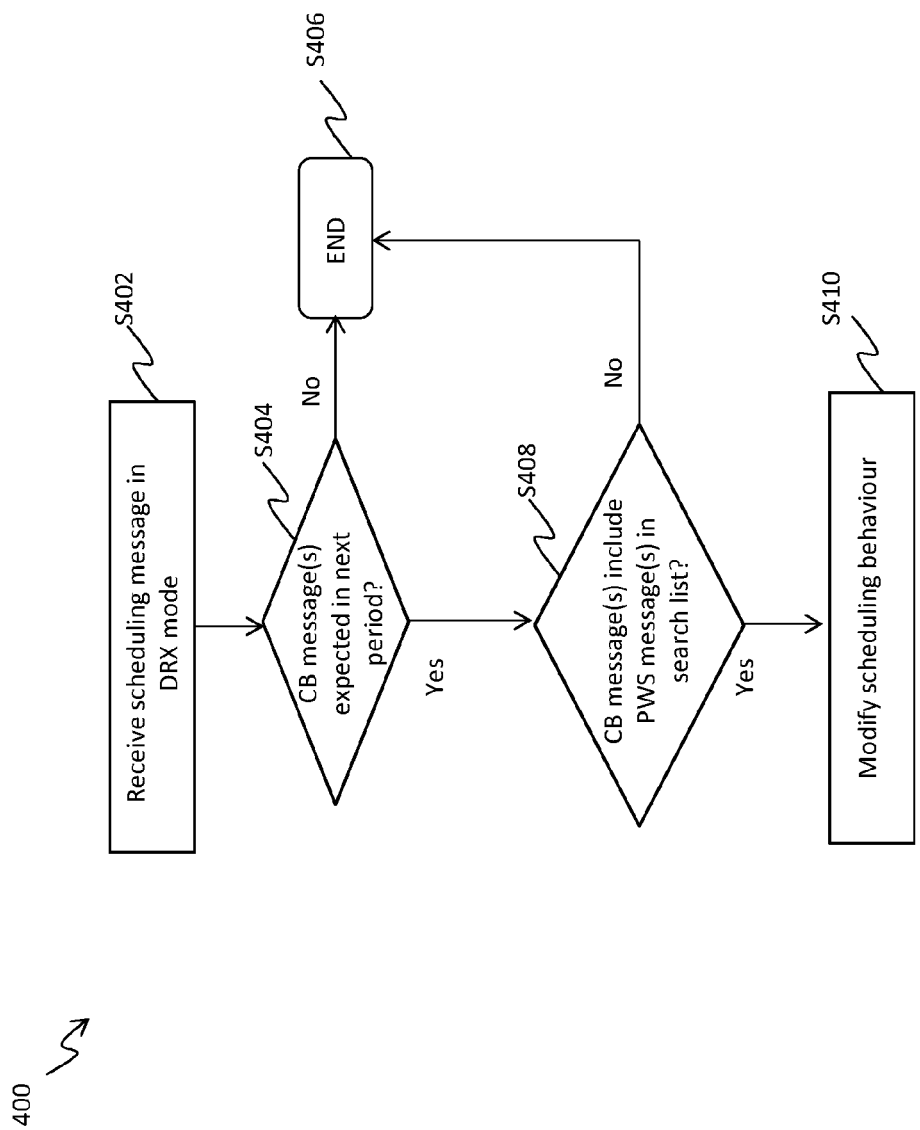
FIG. 4 shows a procedure of controlling the operation of a user equipment.

Referring back to the process 400 shown in FIG. 4, if it is determined at step S408 that one or more expected CB message include a public warning message(s) identified by a message identifier stored in the configurable search list 38 stored by the UE 102, then the process proceeds to step S410.

At step S410 the modem 4 is arranged to modify the internal scheduling behavior at the modem 4 for reception of the one more public warning CB message that is expected in the next schedule period. In contrast to the first embodiment in which step S410 is implemented by modifying a priority scheme 37 held by the UE 102, in the second embodiment, at step S410 the modem is arranged to control the physical layer 301 to stop DRX reception, i.e., leaves the DRX mode immediately (the modem 4 does not wait for the end of the current scheduling cycle) and starts reading all available CB channel time slots.

Referring to UMTS as an example in which CB messages are sent from the radio access network 105 to the UE 102 using the DRX mode on the CTCH logical channel which is mapped onto the FACH transport channel and S-CCPCH physical channel. Following step S410, the modem 4 is arranged to read every time slot of the S-CCPCH where a CB message could be received for reception of a CB message(s). That is, the modem 4 is arranged to read time slots even if the scheduling message received at step S402 did not announce an expected CB message in these time slots.

The second embodiment compensates for badly composed scheduling messages and preventing misalignments that can occur if, due to the sending of a new message (a PWS message), the scheduling period must be modified. This modification of the scheduling period is now briefly described. Normally a scheduling message has a certain length to announce a certain amount of time slots. When a new message needs to be added to the system, it could be that the amount of existing free slots is not enough to add it or the announced length of the next scheduling message is too short. In this case the scheduling period needs to be extended and the scheduling message might need more space (ctch allocation periods) afterwards.

It will be appreciated that whilst the modem 4 is not in the DRX mode, the UE 102 will consume more power than when the modem 4 operates in the DRX mode. However, the higher power consumption is acceptable in this scenario as human life could be in danger.

Once all the PWS messages are received the modem 4 reverts back to operating in the DRX mode to conserve power. The modem 4 will know when all the PWS messages have been received based on the message identifier(s) in the scheduling message received at step S402.

It will be appreciated that the above embodiments have been described only by way of example. Other variants may become apparent to a person skilled in the art given the disclosure herein.

For example, whilst the disclosure has been described with reference to being applicable to a GSM, or UMTS communication systems, the present disclosure can apply to other communication systems implemented in accordance with other radio access technologies. That is, while embodiments above have been described in relation to certain standards such as 3GPP networks, these are not intended to be limiting and the present disclosure may in fact be applied within any communication standard of any radio access network.

Further, although the above has been described in terms of a substantially soft modem implementation, other implementations where more or even all of the described functions are implemented in dedicated hardware are not excluded.

While this disclosure has been particularly shown and described with reference to some embodiments, it will be understood to those skilled in the art that various changes in form and detail may be made without departing from the scope of the disclosure as defined by the appendant claims Those skilled in the art to which this application relates will appreciate that other and further additions, deletions, substitutions and modifications may be made to the described embodiments.

What is claimed is:

1. A modem for use at a terminal, the modem comprising:
a wireless interface arranged to connect to a communications network;
a memory configured to store a priority scheme, the modem configured to handle data received from the communications network according to the priority scheme while in an operating mode; and
a processor configured to:
receive a message from the communications network via the wireless interface whilst in the operating mode;
assess the message on receipt to determine that one or more public warning message is to be broadcast to the modem from the communication network in a second later time period; and
based on said determination, modify operation of the modem in the second later time period to ensure said one or more public warning message is received and acted on by the modem by increasing a priority level associated with the communication channel used to broadcast data for the one or more time slots of the second later time period to a priority level higher than a priority level associated with a paging channel (PCH), wherein the priority level defines a priority given to the respective communication channels for reception of data.

2. The modem of claim 1, wherein the message received from the communications network is a scheduling message, the scheduling message comprising information about one or more message that is scheduled to be transmitted from the communications network to the terminal in the second later time period.

3. The modem of claim 2, wherein the processor is configured to determine that the one or more public warning message is to be broadcast to the modem from the communication network in one or more time slots of the second later time period by comparing one or more message identifier included in the scheduling message to a list comprising one or more countries in which a public warning system is implemented.

4. The modem of claim 1, wherein the processor is configured to increase the priority level associated with the communication channel used for broadcast data such that the priority level associated with the communication channel used for broadcast data for the one or more time slots is the highest priority level in the priority scheme.

5. The modem of claim 1, wherein the communication channel used for broadcast data is a Forward Access Channel (FACH).

6. The modem of claim 1, wherein the communication channel used for broadcast data is a Cell Broadcast Channel (CBCH).

7. The modem of claim 1, wherein the message received from the communications network is an ETWS primary notification.

8. The modem of claim 7, wherein the processor is configured to determine that an ETWS secondary notification is to be broadcast to the modem from the communication network in a second later time period, based on receiving the ETWS primary notification.

9. The modem of claim 8, wherein the modem comprises a memory storing a priority scheme, and the modem is arranged to handle data received from the communications network according to the priority scheme whilst in the operating mode.

10. The modem of claim 9, wherein the priority scheme comprising a plurality of priority levels associated with respective communication channels, the plurality of priority levels defining the priority given to the respective communication channels for reception of data and including a priority level associated with a communication channel used for broadcast data, wherein the processor is configured to modify operation of the modem by increasing the priority level associated with the communication channel used for broadcast data such that the communication channel used for broadcast data is associated with an increased priority level for receipt of the ETWS secondary notification in the second later time period.

11. The modem of claim 10, wherein the processor is configured to increase the priority level associated with the communication channel used for broadcast data such that the increased priority level associated with the communication channel used for broadcast data is the highest priority level in the priority scheme.

12. The modem of claim 10, wherein the priority scheme comprises a priority level associated with a paging channel (PCH), and the processor is configured to increase the priority level associated with the communication channel used for broadcast data such that the increased priority level associated with the communication channel used for broadcast data is higher than the priority level associated with the paging channel.

13. The modem of claim 3, wherein said operating mode is a discontinuous reception mode.

14. The modem of claim 13, wherein the processor is configured to modify operation of the modem by stopping the discontinuous reception mode of operation such that the processor is configured to monitor a communication channel used for broadcast data until the one or more public warning message identified in the scheduling message have been received from the communications network.

15. The modem of claim 14, wherein the processor is configured to return to operating in said operating mode after the one or more public warning message identified in the scheduling message have been received from the communications network.

16. The modem of claim 14, wherein the communication channel used for broadcast data is a Forward Access Channel (FACH).

17. The modem of claim 14, wherein the communication channel used for broadcast data is a Cell Broadcast Channel (CBCH).

18. The modem of claim 1, wherein the terminal comprises a housing and the modem is an internal module within said terminal housing.

19. The modem of claim 18, wherein the modem comprises a second interface arranged to connect to a host processor on the terminal, the second interface comprising a wired connector or connection within said terminal housing to connect to the host processor.

20. The modem of claim 18, wherein the wireless interface connects to a first wireless transceiver of said terminal for connecting to the communications network.

21. The modem of claim 1, wherein the modem comprises an external unit for use at the terminal.

22. The modem of claim 21, wherein the modem comprises a second interface arranged to connect to a host processor on the terminal.

23. The modem of claim 22, wherein the second interface is a serial interface.

24. The modem of claim 22, wherein the modem comprises a dongle housing, said modem for plugging into said terminal via the second interface.

25. The modem of claim 22, wherein the wireless interface comprises a first wireless transceiver for connecting to the communications network.

26. The modem of claim 11, wherein the second interface comprises a second wireless transceiver for connecting to the terminal via a local wireless connection.

27. A method of operating a modem at a terminal, the modem having a processor and a wireless interface arranged to connect to a communications network, the method comprising:
   in a first time period, receiving a message from a communications network whilst in an operating mode;
   assessing the message on receipt to determine that one or more public warning message is to be broadcast to the modem from the communication network in a second later time period; and
   based on said determination, modifying operation of the modem in the second later time period to ensure said one or more public warning message is received and acted on by the modem increasing a priority level associated with the communication channel used to broadcast data for the one or more time slots of the second later time period to a priority level higher than a priority level associated with a paging channel (PCH), wherein the priority level defines a priority given to the respective communication channels for reception of data.

28. A computer program product for operating a modem for use at a terminal, the modem having a processor and a wireless interface arranged to connect to a communications network, the computer program product comprising code embodied on a non-transitory computer-readable medium and configured so as when executed on the processor of the modem to:
   assess a message, received in a first time period from a communications network whilst in an operating mode, on receipt to determine that one or more public warning message is to be broadcast to the modem from the communication network in a second later time period; and
   based on said determination, modify operation of the modem in the second later time period to ensure said one or more public warning message is received and acted on by the modem by increasing a priority level associated with the communication channel used to broadcast data for the one or more time slots of the second later time period to a priority level higher than a priority level associated with a paging channel (PCH), wherein the priority level defines a priority given to the respective communication channels for reception of data.

* * * * *